United States Patent [19]

Shih

[11] Patent Number: 5,191,043

[45] Date of Patent: Mar. 2, 1993

[54] PRECIPITATION POLMERIZATION OF COPOLYMERS OF A VINYL LACTAM AND A POLYMERIZABLE CARBOXYLIC ACID HAVING A MOLECULAR WEIGHT OF LESS THAN 20,000 IN A COSOLVENT MIXTURE OF AN ALIPHATIC HYDROCARBON SOLVENT AND ISOPROPANOL

[75] Inventor: Jenn S. Shih, Paramus, N.J.

[73] Assignee: ISP Investments Inc., Wilmington, Del.

[21] Appl. No.: 851,707

[22] Filed: Mar. 16, 1992

[51] Int. Cl.$^5$ .............................................. C08F 2/14
[52] U.S. Cl. .................................... 526/212; 526/264
[58] Field of Search ................................ 526/264, 212

[56] References Cited

U.S. PATENT DOCUMENTS 5,011,895  4/1991  Shih et al. .............................. 526/88
5,015,708  5/1991  Shih et al. ............................ 526/264

FOREIGN PATENT DOCUMENTS

WO90/12041  10/1990  PCT Int'l Appl. ................. 526/264

Primary Examiner—Joseph L. Schofer
Assistant Examiner—Alex H. Walker
Attorney, Agent, or Firm—Walter Katz; Marilyn J. Maue; Joshua J. Ward

[57] ABSTRACT

What is described herein is a precipitation polymerization process in a reaction mixture of a vinyl lactam, e.g. vinyl pyrrolidone or vinyl caprolactam, and a polymerizable carboxylic acid, e.g. acrylic acid or methacylic acid, in the presence of a polymerization initiator, in a cosolvent mixture of an aliphatic hydrocarbon solvent, particularly, a $C_3$-$C_{10}$ saturated hydrocarbon, which is branched or unbranched, cyclic or acylic, and preferably, is heptane or cyclohexane and a secondary alochol, preferably isopropanol. The copolymers obtained thereby have an advantageous low molecular weight of less than 20,000.

15 Claims, No Drawings

PRECIPITATION POLMERIZATION OF COPOLYMERS OF A VINYL LACTAM AND A POLYMERIZABLE CARBOXYLIC ACID HAVING A MOLECULAR WEIGHT OF LESS THAN 20,000 IN A COSOLVENT MIXTURE OF AN ALIPHATIC HYDROCARBON SOLVENT AND ISOPROPANOL

CROSS-REFERENCE TO RELATED COPENDING U.S. PATENTS AND PATENT APPLICATIONS

1. Shih, in U.S. Pat. No. 5,015,708, described and claimed a precipitation polymerization process for making terpolymers of a vinyl lactam, a polymerizable carboxylic acid and a hydrophobic monomer in an aliphatic hydrocarbon solvent.

2. Shih, in U.S. Pat. No. 5,011,895, described and claimed a polymerization polymerization process for making copolymers of a vinyl lactam and a polymerizable carboxylic acid using sub-surface feeding.

BACKGROUND OF THE INVENTION

1. Field of the Invention

This invention relates to precipitation polymerization of copolymers of a vinyl lactam and a polymerizable carboxylic acid, and, more particularly, to such copolymers having a wide compositional range, prepared in high yield, as a white powder, which can be filtered and dried easily, and which have an advantageous low molecular weight of less than 20,000.

2. Description of the Prior Art

Copolymers of vinyl lactams, e.g. vinyl pyrrolidone (VP) or vinyl caprolactam (VCL), and polymerizable carboxylic acids, e.g. acrylic acid (AA) or methacrylic acid (MAA), have found application in the photographic industry, as coatings, as biological membranes, in drug release systems, as preservatives, in oil recovery processes, in immunochemicals, and in cosmetic materials.

Solution polymerization and precipitation polymerization are two available methods for making these copolymers; see U.S. Pat. Nos. 3,044,873; 3,862,915; and 4,283,384; articles by Takeski, in J. Makromol. Chem. 148, 205 (1971), and by Uelzmann, in J. Polymer Sci. 33, 377 (1958); and Belgian Patent No. 668,368.

The solution polymerization process is used when both reactant monomers and the copolymer product are soluble in a reaction solvent. However, this method suffers from the following disadvantages:

(1) Desirable compositions of the copolymer may not be soluble in a selected solvent; (2) the yields of such copolymer may be low; (3) the copolymer may be colored; (4) the solvent may be a high boiling liquid which is difficult to separate from the copolymer; and (5) the solvent may be a protic liquid, e.g. water or mixtures thereof, which causes considerable hydrolysis of the vinyl lactam under acidic reaction conditions.

The precipitation polymerization method is useful when the monomers are soluble in the reaction solvent and the copolymers are insoluble in the solvent. Benzene, tetrahydrofuran, heptane, acetone and methyl ethyl ketone are known precipitation polymerization solvents. Unfortunately, these solvents have one or more of the following disadvantages:

(1) Useful copolymer compositions may not be insoluble in a selected reaction solvent, which restricts the process to a narrow copolymer compositional range; (2) the copolymer may precipitate only as a gelatinous mass which is difficult to filter; (3) low yields of polymer may be obtained; (4) the solvent may be toxic; and (5) low molecular weight copolymers may be difficult to make by available processes.

For these and other reasons, present solution polymerization and precipitation polymerization processes for making low molecular weight copolymers of a vinyl lactam and an acrylic acid have not been very successful on a commercial scale.

Accordingly, it is an object of this invention to provide an improved method of making low molecular weight copolymers of a vinyl lactam and a polymerizable carboxylic acid, particularly copolymers of vinyl pyrrolidone and acrylic acid having an advantageous low molecular weight of less than 20,000.

Another object of the present invention is to provide an effective reaction solvent in a precipitation polymerization process which will provide copolymers having advantageous physical properties, including low hygroscopicity, high glass transition temperatures, and, particularly, low average molecular weights.

Yet another object herein is to provide a precipitation polymerization process in which the copolymers will precipitate in high yield as a fine white powder which is insoluble in the reaction solvent over the entire compositional range of the copolymer.

A feature of the invention is the provision of a precipitation polymerization process for making copolymers of a vinyl lactam and a polymerizable carboxylic acid in which a mixture of an aliphatic hydrocarbon and a secondary alcohol such as isopropanol is used as the reaction solvent.

Another feature of the invention is the provision of copolymers of a vinyl lactam and a polymerizable carboxylic acid made by a precipitation polymerization process in which the reaction solvent is a mixture of heptane and a secondary alcohol such as isopropanol, the latter being present in an amount of about 30% or less, preferably 5–15%, by weight of the mixture.

Still another feature of the invention is the provision of copolymers of a vinyl lactam and a polymerizable carboxylic acid over the complete compositional range of monomers, which copolymers are characterized by having a low weight average molecular weight, Mw, of less than about 20,000, low hygroscopicity, a high glass transition temperature, being a white powder, exhibiting polyelectrolyte behavior, and which are soluble in an aqueous basic solution of pH 8 and insoluble in an aqueous acid solution of pH 3.

SUMMARY OF THE INVENTION

What is described herein is a precipitation polymerization process and copolymer products produced thereby. The polymerization is carried out on a reaction mixture of a vinyl lactam, e.g. vinyl pyrrolidone or vinyl caprolactam, and a polymerizable carboxylic acid, e.g. acrylic acid or methacrylic acid, in the presence of a polymerization initiator, e.g. a free radical initiator, in a cosolvent mixture of an aliphatic hydrocarbon solvent, preferably, a $C_3$–$C_{10}$ saturated, branched or unbranched, cyclic or acyclic, and, preferably is heptane or cyclohexane, and a secondary alcohol, preferably isopropanol, and, preferably, about 30% or less, most preferably 5–15%, by weight of the latter.

The process herein provides copolymers having a weight ratio of vinyl lactam to polymerizable carboxylic acid of 1:99 to 99:1, and as a white powder, which powder precipitates readily from the aliphatic hydrocarbon solvent and is easily filtered and dried.

The copolymers herein have a low weight average molecular weight, Mw suitably less than about 20,000, as compared to the medium to high molecular weight copolymers made using the aliphatic hydrocarbon solvent alone.

DETAILED DESCRIPTION OF THE INVENTION

In accordance with the invention, copolymers of a vinyl lactam and a polymerizable carboxylic acid are made by a precipitation polymerization process in a mixture of an aliphatic hydrocarbon solvent and a secondary alcohol in the presence of a polymerization initiator.

Suitable vinyl lactams for use herein include vinyl pyrrolidone, vinyl caprolactam and alkylated vinyl derivatives thereof. Suitable polymerizable carboxylic acids include e.g. acrylic acid, methacrylic acid, itaconic acid, maleic acid, and crotonic acid. Acrylic acid itself, or methacrylic acid, is a preferred coreactant monomer in the polymerization. These monomers may be employed in weight ratios over the entire compositional range of the copolymers, i.e. from 1-99 weight percent vinyl lactam and 99:1 weight percent of acrylic acid. Accordingly, weight ratios of VP:AA in the copolymer of 99:1, 75:25, 50:50, 25:75 and 1:99, for example, may be conveniently prepared in this invention in substantially quantitative yields.

Other copolymerizable monomers may be included as additional coreactants, in an amount of 0-30% by weight of the copolymer. Suitable optional comonomers include acrylic acid esters, vinyl esters, acrylamide, N-alkylacrylamides, and the like.

The reaction solvent of the invention includes a $C_3$-$C_{10}$ saturated hydrocarbon which is branched or unbranched, cyclic or acyclic. Preferably the solvent includes a $C_5$-$C_8$ aliphatic hydrocarbon or mixtures thereof.

A preferred aliphatic hydrocarbon solvent over other known precipitation polymerization solvents is selected from heptane and cyclohexane. Heptane, the most preferred solvent, provides high yields of a precipitate of the desired copolymer composition as a fine white powder which is easy to filter and dry. This advantageous result is surprising since vinyl pyrrolidone itself readily homopolymerizes in heptane to produce gummy products.

Suitable secondary alcohols for use as a cosolvent herein have the formula $R_1R_2CHOH$, where $R_1$ and $R_2$ are independently lower alkyl, preferably $C_1$-$C_6$, and, most preferably $R_1$ and $R_2$ are methyl, i.e. isopropanol.

The amount of solvent used in the process of the invention should be sufficient to dissolve an appreciable amount of the reactants and to maintain the copolymer precipitate in a stirrable state at the end of the polymerization. Generally, up to about 40% solids, preferably 15-20% solids, is maintained in the reaction mixture.

The precipitation polymerization process of the invention is carried out in the presence of a polymerization initiator, preferably a free radical initiator, and most suitably, a peroxy ester, e.g. t-butylperoxy pivalate, although other free radical initiators such as acyl-peroxides, alkyl peroxides and azo-nitriles, known in the art or described in the aforementioned references, may be used as well.

The amount of such initiator may vary widely; generally about 0.2-5.0% is used, based on the weight of total monomers charged. Suitably, the initiator may be precharged or added during the polymerization run.

The reaction temperature may vary widely; generally the reactants are maintained at about 50°-150° C., preferably 60°-70° C., during the polymerization. Pressure usually is kept at atmospheric pressure, although higher and lower pressures may be used as well.

The reaction mixture should be stirred vigorously under an inert atmosphere, e.g. nitrogen, during the polymerization. A stirring rate of about 400-600 rpm in a 1-liter lab reactor is quite adequate to effect the desired polymerization and to keep the precipitate in a stirrable state during the polymerization.

The monomers and initiator used herein are commercially available materials, as described below.

|  | Source | Form |
| --- | --- | --- |
| Monomers |  |  |
| Vinyl pyrrolidone | ISP | Liquid |
| or |  |  |
| Vinyl caprolactam | Aldrich | Solid |
| Acrylic acid | Rohm and Haas | Liquid |
| or |  |  |
| Methacrylic acid | Aldrich | Liquid |
| Initiator |  |  |
| t-Butylperoxy pivalate | ATO Chemical Corp. (Lupersol 11) | Liquid; 75% solution in mineral spirits |

The precipitation polymerization process of the invention may be carried out by first precharging a suitable reactor with a predetermined amount of a vinyl lactam in the solvent mixture of aliphatic hydrocarbon solvent and secondary alcohol, and heating the solution to a desired reaction temperature while stirring vigorously under an inert gas atmosphere. The initiator is then charged into the reactor. Then a selected amount of the polymerizable carboxylic acid, e.g. acrylic acid, optionally with another comonomer, is admitted into the reactor over a period of time, generally about an hour or more. Then the reaction mixture is held for an additional period of time for polymerization to occur. Finally, the mixture is cooled to room temperature. Filtering, washing with solvent, and drying provides the copolymer in yields approaching quantitative, and, substantially, in a composition predetermined by the weight ratio of monomers introduced into the reactor.

Alternatively, the aliphatic hydrocarbon solvent and secondary alcohol can be precharged into the reactor, purged with nitrogen, heated to reaction temperature, the initiator added, and then separate streams of the vinyl lactam monomer, the acrylic acid monomer and optional comonomer are introduced over a period of time into the precharged reactor. Other process variations will be apparent to those skilled in the art.

The polymers of the invention are generally characterized by their having high average molecular weights, low hygroscopicity, high glass transition temperatures, and exhibiting polyelectrolyte behavior in water, as described below.

a. Molecular Weight

The weight average molecular weight, Mw, for a 75:25 wt. ratio VP:AA copolymer, for example, having a Fikentscher K-value of about 20, was about 20,000, or less, as determined by gel permeation chromatograph (GPC).

b. Hygroscopicity

The hygroscopicity of the copolymers is lower than the weighted average of the homopolymers. This effect is maximized for copolymers, for example, having a VP:AA mole ratio of about 1:1, where the hydroscopicity may be actually lower than the value of either homopolymer. Hygroscopicity is measured by the equilibrium moisture pickup of the copolymer powders at 50% relative humidity.

c. Glass Transition Temperature, Tg

This property shows the effect of strong hydrogen bonding in the copolymer which causes a strong positive deviation from typical behavior, which is most prominent at a vinyl lactam:acrylic or methacrylic acid mole ratio of about 1:1. Typically the Tg is about 20° lower than copolymers made without isopropanol, and is usually about 110°-170° C.

d. Solubility

The copolymer exhibits very unusual solubility characteristics: it is insoluble in aqueous acid solution of pH 3 but soluble in basic solution of pH 8. Table I below illustrates the solubility characteristics of copolymers of different compositions in several aqueous and organic solvents.

Synthesis of Poly(N-Vinyl Pyrrolidone/Acrylic Acid)

In a two-liter, four-necked reaction kettle equipped with a condenser, a mechanical stirrer, two dip tubes connected to two metering pumps, a nitrogen purge adaptor, and a thermocouple connected to the temperature controller, and a cosolvent mixture of 1000 grams of heptane and suitable amounts of isopropanol were charged and the reactor was heated to 80° C. in 30 minutes with nitrogen purge throughout the whole process. The reactor temperature was held at 80° C. for 30 minutes. Then t-butylperoxypivalate (Lupersol 11) in the amounts given in Tables 1, 2 and 3 were added into the reactor and N-vinylpyrrolidone and acrylic acid (in amounts given in Tables 1, 2 & 3) were fed into the reactor over a period of 4 hours. After completion of feeding of N-vinyl pyrrolidone and acrylic acid monomers, the reaction temperature was raised to 85° C. during 30 minutes and held for another 30 minutes. Thereafter 200 microliters of t-butylperoxy pivalate was charged 4 times every 2 hours and the reaction was kept stirring at 85° C. The reactor was cooled to room temperature and its contents were collected. The polymer was dried in a hood overnight, and, thereafter, further dried under vacuum oven at 90° C. overnight.

TABLE 1

VP/AA 75/25 HEPTANE/ISOPROPANOL

| Ex. No. | Initiator | Amount of Initiator | Co-solvent H/I (w/w) | Temp. (°C.) | Initiator Feed times | Total VP/AA |
|---|---|---|---|---|---|---|
| 1 | Lupersol 11 | 3.0% | 90/10 | 80 | t = 0 | 200 g |
| 2 | Lupersol 11 | 2.0% | 90/10 | 80 | t = 0 | 200 g |
| 3 | Lupersol 11 | 1.0% | 90/10 | 80 | t = 0 | 200 g |
| 4 | Lupersol 11 | 3.0% | 90/10 | 75 | t = 0 | 200 g |
| 5 | Lupersol 11 | 3.0% | 90/10 | 80 | t = 0, 1.5 & 3 | 200 g |
| 6 | Vazo 64 | 3.0% | 90/10 | 80 | t = 0 | 200 g |
| 7 | Lupersol 11 | 3.0% | 85/15 | 80 | t = 0 | 200 g |
| 8 | Lupersol 11 | 3.0% | 95/5 | 80 | t = 0 | 200 g |
| 9 | Lupersol 11 | 2.0% | 90/10 | 75 | t = 0 | 200 g |
| 10 | Lupersol 11 | 1.0% | 90/10 | 75 | t = 0 | 200 g |
| 11 | Lupersol 554 | 3.0% | 90/10 | 80 | t = 0 | 200 g |

| Ex. No. | Feed Time (hr) | Mw* | Mn** | K-Value*** | Yield (%) |
|---|---|---|---|---|---|
| 1 | 4 | 10,000 | 6,200 | 18.3 | 94.1 |
| 2 | 4 | 13,000 | 7,600 | 20.4 | 97.3 |
| 3 | 4 | 16,000 | 8,700 | 21.9 | 96.2 |
| 4 | 4 | 12,000 | 7,500 | 19.6 | 84.9 |
| 5 | 4 | 10,600 | 7,100 | 19.5 | 100 |
| 6 | 4 | 16,300 | 8,300 | 22.2 | 97.6 |
| 7 | 4 | 12,300 | 7,200 | 18.3 | 91.7 |
| 8 | 4 | 16,500 | 8,200 | 24.6 | 96.2 |
| 9 | 4 | 11,200 | 8,000 | 21.6 | 96.8 |
| 10 | 4 | 17,200 | 9,100 | 22.5 | 98.2 |
| 11 | 4 | 13,300 | 8,200 | 21.7 | 86.2 |

*weight average molecular weight
**number average molecular weight
***Fikentscher K-value

TABLE 2

VP/AA 50/50 HEPTANE/ISOPROPANOL

| Ex. No. | Initiator | Amount of Initiator | Co-solvent H/I (w/w) | Temp. (°C.) | Initiator Feed times | Total VP/AA |
|---|---|---|---|---|---|---|
| 12 | Lupersol 11 | 3.0% | 90/10 | 80 | t = 0 | 200 g |
| 13 | Lupersol 11 | 3.0% | 90/10 | 80 | t = 0 | 200 g |
| 14 | Lupersol 11 | 2.0% | 90/10 | 80 | t = 0 | 200 g |
| 15 | Lupersol 11 | 1.0% | 90/10 | 80 | t = 0 | 200 g |
| 16 | Lupersol 11 | 520 microlit | 90/10 | 80 | t = 0 | 200 g |
| 17 | Lupersol 11 | 3.0% | 90/10 | 75 | t = 0, 1.5 & 3 | 200 g 200 g |
| 18 | Lupersol 11 | 3.0% | 90/10 | 80 | t = 0 | 200 g |
| 19 | Vazo 67 | 3.0% | 90/10 | 80 | t = 0 | 200 g |
| 20 | Lupersol 11 | 3.0% | 85/15 | 80 | t = 0 | 200 g |
| 21 | Lupersol 11 | 3.0% | 95/5 | 80 | t = 0 | 200 g |
| 22 | Lupersol 554 | 3.0% | 90/10 | 80 | t = 0 | 200 g |

| Ex. No. | Feed Time (hr) | Mw | Mn | K-Value | Yield (%) |
|---|---|---|---|---|---|
| 12 | 4 | 10,000 | 6,200 | 17.1 | 84 |
| 13 | 4 | 9,600 | 7,000 | 17.1 | 92.3 |
| 14 | 4 | 11,000 | 7,800 | 19.0 | 92.8 |
| 15 | 4 | 13,500 | 9,300 | 21.7 | 96.5 |
| 16 | 4 | 20,000 | 12,600 | 27.2 | 94.3 |
| 17 | 4 | 9,700 | 7,200 | 17.9 | 97.0 |
| 18 | 4 | 9,100 | 7,000 | 17.1 | 97.0 |
| 19 | 4 | 14,500 | 10,300 | 22.7 | 97.3 |
| 20 | 4 | 8,800 | 6,600 | 16.4 | 85.7 |
| 21 | 4 | 13,500 | 9,200 | 22.0 | 94 |
| 22 | 4 | 10,700 | 7,500 | 18.8 | 90.5 |

TABLE 3

VP/AA 25/75 HEPTANE/ISOPROPANOL

| Ex. No. | Initiator | Amount of Initiator | Co-solvent H/I (w/w) | Temp. (°C.) | Initiator Feed times | Total VP/AA |
|---|---|---|---|---|---|---|
| 23 | Lupersol 11 | 3.0% | 95/5 | 80 | t = 0 | 200 g |
| 24 | Lupersol 11 | 3.0% | 95/5 | 80 | t = 0 | 200 g |
| 25 | Lupersol 11 | 2.0% | 95/5 | 80 | t = 0 | 200 g |
| 26 | Lupersol 11 | 1.0% | 95/5 | 80 | t = 0 | 200 g |
| 27 | Lupersol 11 | 3.0% | 95/5 | 75 | t = 0 | 200 g |
| 28 | Lupersol 11 | 3.0% | 95/5 | 80 | t = 0, 1.5 & 3 | 200 g |
| 29 | Lupersol 11 | 3.0% | 98/2 | 80 | t = 0 | 200 g |
| 30 | Lupersol 554 | 3.0% | 90/10 | 80 | t = 0 | 200 g |

| Ex. No. | Feed Time (hr) | Mw | Mn | K-Value | Yield (%) |
|---|---|---|---|---|---|
| 23 | 4 | 16,500 | 10,000 | 24.2 | 98.5 |
| 24 | 4 | 16,500 | 10,000 | 23.6 | 88 |

TABLE 3-continued

| VP/AA 25/75 HEPTANE/ISOPROPANOL | | | | | |
|---|---|---|---|---|---|
| 25 | 4 | 17,100 | 10,900 | 24.9 | 95.1 |
| 26 | 4 | 22,000 | 13,300 | 29.4 | 91.6 |
| 27 | 4 | 14,300 | 9,800 | 22.0 | 87.8 |
| 28 | 4 | 13,800 | 9,800 | 21.7 | 95.7 |
| 29 | 4 | 19,000 | 11,800 | 26.1 | 97.5 |
| 30 | 4 | 18,900 | 10,500 | 25.3 | 89.8 |

While the invention has been described with particular reference to certain embodiments thereof, it will be understood that changes and modifications may be made which are within the skill of the art. Accordingly, it is intended to be bound only by the following claims, in which:

What is claimed is:

1. A precipitation polymerization process for making fine, white, powdered copolymers of a vinyl lactam and a polymerizable carboxylic acid, optionally with a polymerizable comonomer, having a weight average molecular weight of about 20,000 or less, which comprises:

(a) charging a reactor with a cosolvent mixture of a $C_3$-$C_{10}$ saturated hydrocarbon, branched of unbranched, cyclic or acylic, and about 2 to 30% by weight of a secondary alcohol in which the copolymer product is substantially insoluble over the entire compositional range of the copolymers, and a polymerization initiator, which is heated to 50° to 150° C., and agitated; and (b) simultaneously feeding selected amounts of a vinyl lactam and a polymerizable carboxylic acid, optionally with a polymerizable comonomer, and, if desired, additional polymerization initiator, into said reactor while continuing to agitate the reaction mixture to precipitate the copolymer as a fine, white powder from solution.

2. A process according to claim 1 including the steps of (c) filtering the reaction product, and (d) drying the precipitate to obtain the copolymer product.

3. A process according to claim 1 including the steps of recovering the reaction product from the reactor and drying.

4. A process according to claim 1 wherein, in step (a), the temperature is 60° to 85° C.

5. A process according to claim 1 wherein the copolymer product ranges from 1:99 weight percent vinyl lactam and 99:1 weight percent polymerizable carboxylic acid.

6. A process according to claim 1 wherein said vinyl lactam is vinyl pyrrolidone or vinyl caprolactam.

7. A process according to claim 1 wherein said polymerizable carboxylic acid is acrylic acid or methacrylic acid.

8. A process according to claim 1 which includes the step of removing the solvent from the reaction product in the reactor to provide the copolymer product as a powder.

9. A process according to claim 1 wherein the monomers are added as separate streams of each monomer, or as a mixture of both monomers.

10. A process according to claim 1 wherein the monomers are fed into the reactor over a predetermined period of time.

11. A process according to claim 1 wherein said amount of secondary alcohol is about 5-15%.

12. A process according to claim 1 wherein said saturated hydrocarbon is heptane or cyclohexane.

13. A process according to claim 1 wherein said secondary alcohol has the formula $R_1R_2CHOH$ where $R_1$ and $R_2$ are independently a lower alkyl group which is $C_1$-$C_6$ alkyl.

14. A process according to claim 13 wherein said secondary alcohol is isopropanol.

15. Fine, white powdered copolymers of a vinyl lactam and a polymerizable carboxylic acid having a weight average molecular weight of about 20,000 or less, and a Tg of about 110°-170° C.

* * * * *